United States Patent [19]
Shuert

[11] Patent Number: 5,427,732
[45] Date of Patent: Jun. 27, 1995

[54] METHOD OF FORMING DEEP DRAW TWIN SHEET PLASTIC ARTICLES

[76] Inventor: Lyle H. Shuert, 70 Kingsley Manor Dr., Bloomfield Hills, Mich. 48304

[21] Appl. No.: 174,110

[22] Filed: Dec. 28, 1993

[51] Int. Cl.⁶ .................. B29C 51/06; B29C 51/10
[52] U.S. Cl. ........................ 264/545; 425/388
[58] Field of Search .................. 264/545; 425/388

[56] References Cited

U.S. PATENT DOCUMENTS

| | | | |
|---|---|---|---|
| 1,535,354 | 4/1925 | Steele et al. | 264/545 |
| 2,670,501 | 3/1954 | Michaels | 18/56 |
| 3,242,245 | 3/1966 | Greig et al. | 264/89 |
| 3,250,660 | 5/1966 | Greig et al. | 156/581 |
| 3,383,720 | 5/1968 | Greig et al. | 9/6 |
| 3,396,430 | 8/1968 | Westcott | 18/19 |
| 3,412,183 | 11/1968 | Anderson et al. | 264/40 |
| 3,462,330 | 8/1969 | Greig et al. | 156/197 |
| 3,539,416 | 11/1970 | Sanders | 156/499 |
| 3,583,036 | 6/1971 | Brown | 18/19 |
| 3,767,740 | 10/1973 | Jones-Hinton et al. | 264/545 |
| 3,787,158 | 1/1974 | Brown | 425/156 |
| 3,867,088 | 2/1975 | Brown et al. | 425/504 |
| 3,868,209 | 2/1975 | Howell | 425/504 |
| 3,925,140 | 12/1975 | Brown | 156/382 |
| 4,039,643 | 8/1977 | Dean et al. | 264/92 |
| 4,192,701 | 3/1980 | Martin et al. | 156/285 |
| 4,427,476 | 1/1984 | Beck et al. | 264/545 |
| 5,108,529 | 4/1992 | Shuert | 264/545 |

FOREIGN PATENT DOCUMENTS 2256945 3/1973 Germany .................. 264/545

Primary Examiner—Catherine Timm
Attorney, Agent, or Firm—Young, MacFarlane & Wood

[57] ABSTRACT

A method of utilizing a male mold and a complementary female mold to thermoform first and second plastic sheets and thereafter fuse the sheets together to form a twin sheet plastic article. The female mold is moved upwardly into sealing engagement with the underside of the first plastic sheet to form an annular seal with the first plastic sheet; a bubble is formed in the first plastic sheet within the annular seal; the male mold is lowered into the bubble to move the bubble into general conformity with the cavity surface; the male mold is raised; a vacuum is applied to the cavity surface to conform the bubble totally to the cavity surface; a second plastic sheet is positioned between the molds; a pre-draw box is positioned between the second plastic sheet and the female mold and moved upwardly into sealing engagement with the underside of the second plastic sheet to form an annular seal with the second plastic sheet; a bubble is formed in the second plastic sheet within the annular seal; the male mold is moved downwardly into the bubble to generally conform the bubble to the male mold surface; a vacuum is applied to the male mold surface to conform the bubble totally to the male mold surface; the pre-draw box is removed; and the molds are brought together to selectively fuse the first plastic sheet to the second plastic sheet to form the twin sheet plastic article.

14 Claims, 5 Drawing Sheets

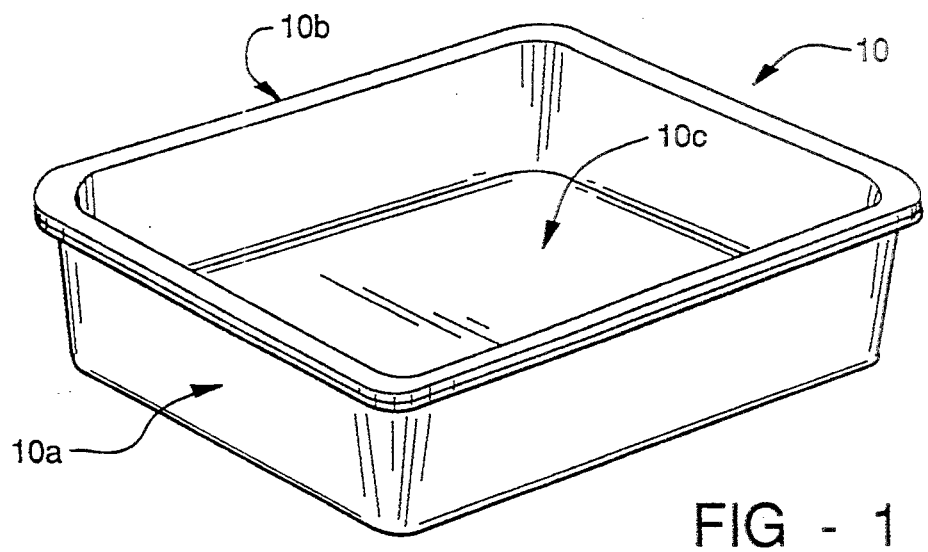
FIG - 1
FIG - 6
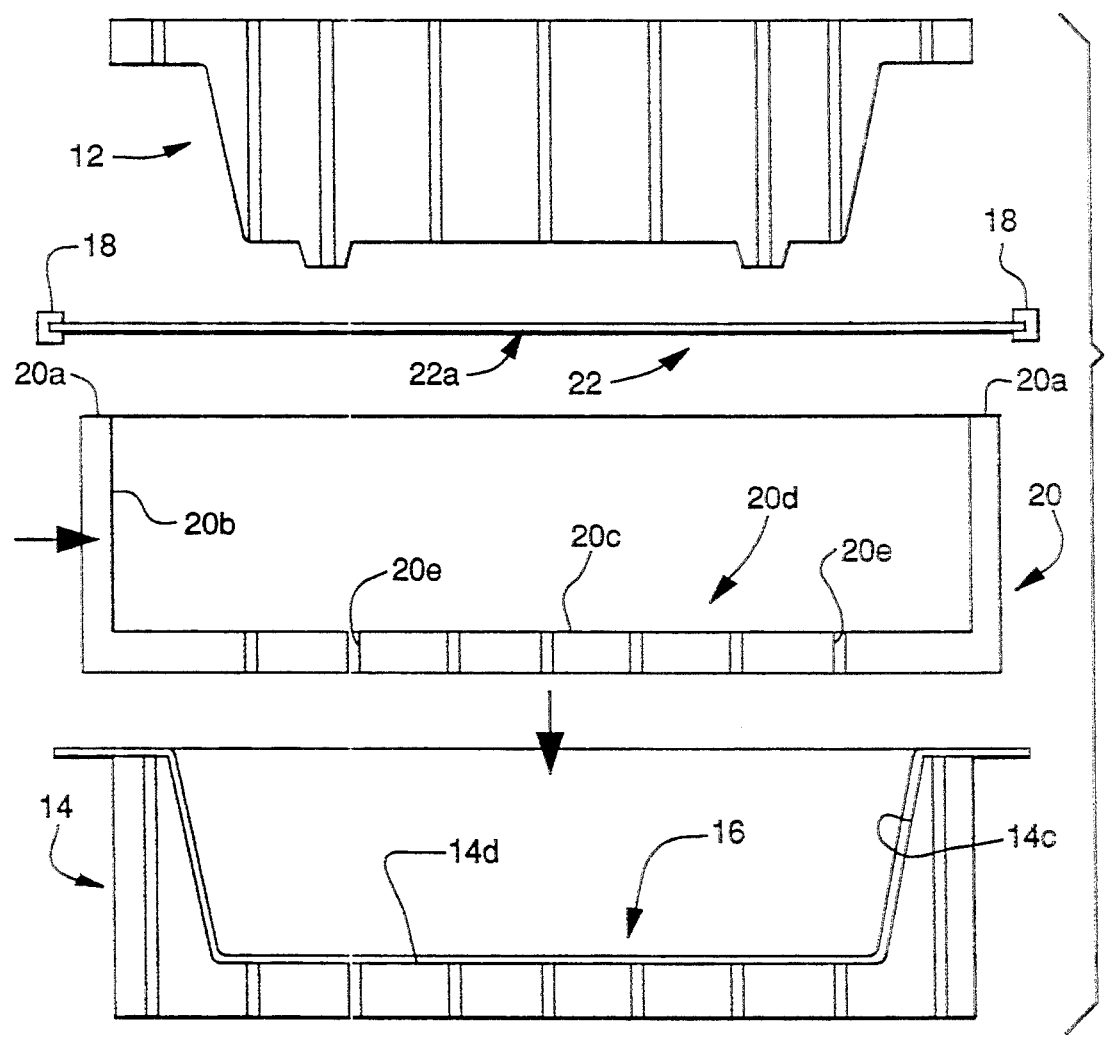

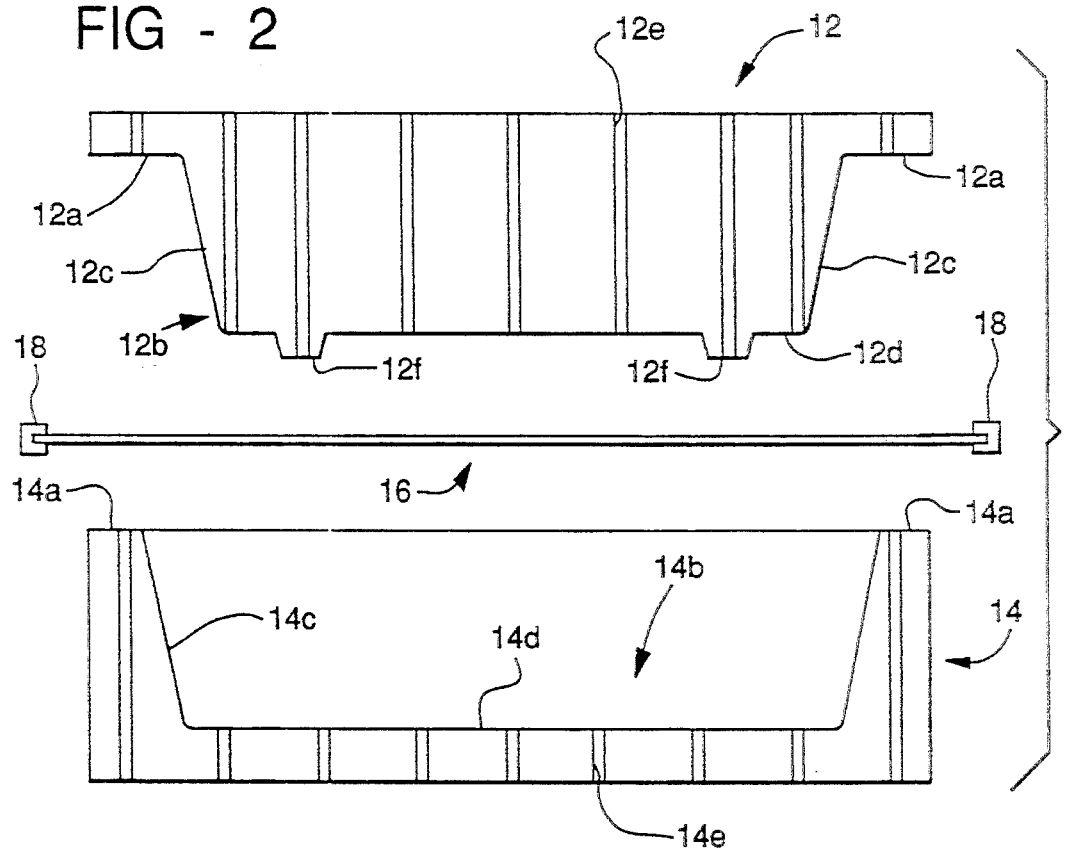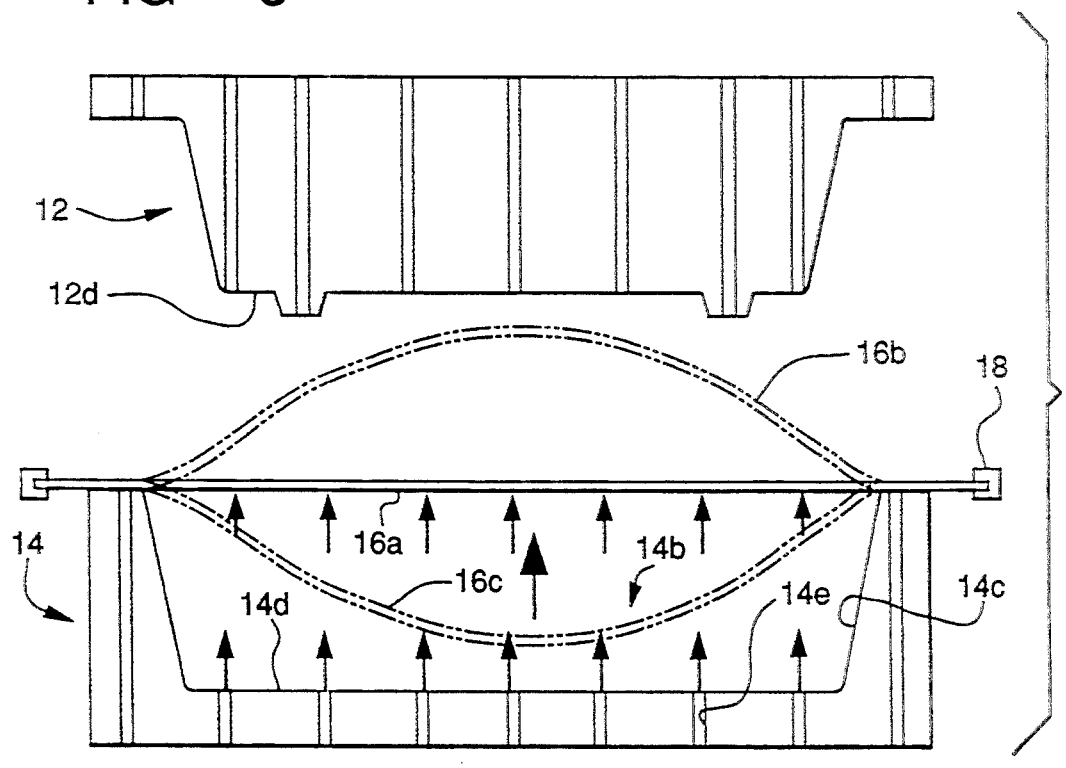

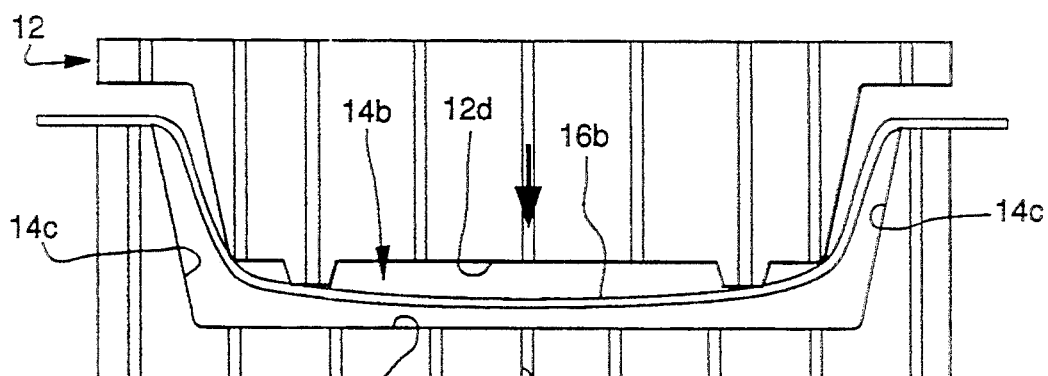
FIG - 4
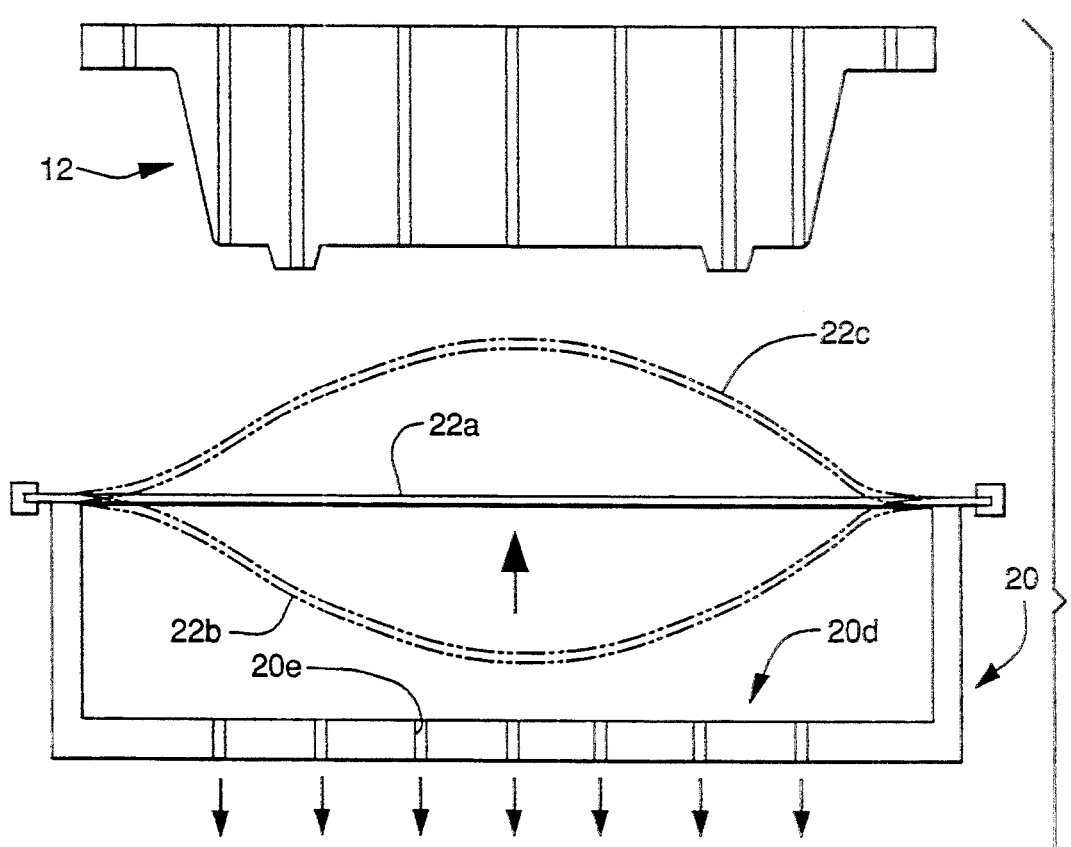
FIG - 7
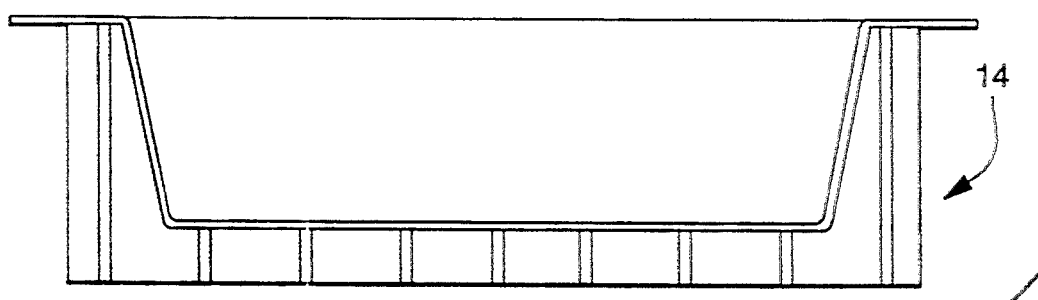

METHOD OF FORMING DEEP DRAW TWIN SHEET PLASTIC ARTICLES

BACKGROUND OF THE INVENTION

This invention relates to a method of forming a plastic article and more particularly to a method of forming a deep draw twin sheet plastic article.

Twin sheet plastic articles are typically formed by thermoforming an upper plastic sheet over a male mold having a downwardly extending protrusion, thermoforming a lower plastic sheet over a female mold having a cavity generally complementary to the male mold protrusion, and thereafter selectively fusing the thermoformed upper and lower sheets together with the upper sheet nested within the lower sheet to form the twin sheet structure. Whereas this twin sheet structure provides, for a given quantity of plastic, an extremely strong and durable article, problems arise when an attempt is made to apply the twin sheet technology to articles having a configuration requiring a deep drawing of the plastic.

Specifically, when the sheets are thermoformed over an upper male protrusion and into a lower female cavity, the plastic material tends to thin out with the thinning maximizing in the upper corner region of the male protrusion and the lower corner region of the female cavity so that the resulting twin sheet article has thinned and weakened regions. In an effort to overcome this problem, it has been proposed to utilize thicker plastic sheets so that, despite the thinning, the final twin sheet article still has satisfactory strength. However, this solution results in a heavier article for a given strength specification as well as a more expensive article.

SUMMARY OF THE INVENTION

This invention is directed to the provision of an improved method of forming a plastic article.

More specifically, this invention is directed to the provision of an improved method of forming a deep draw twin sheet plastic article.

Twin sheet plastic articles are typically formed utilizing a male mold having a protrusion surface and a female mold having a cavity surface generally complementary to the protrusion surface. The first and second sheets are respectively thermoformed to the male and female molds, and the molds are thereafter brought together to fuse the sheets together to form the twin sheet plastic article.

According to the invention, the female mold is moved into sealing engagement with a surface of the first plastic sheet to form an annular seal, a first bubble is formed in the first plastic sheet within the annular seal, the first bubble is moved into general conformity with the cavity surface of the female mold, vacuum is applied to the cavity surface to totally conform the first bubble to the cavity surface, an auxiliary mold device is moved against a surface of the second plastic sheet to form an annular seal, a second bubble is formed in the second plastic sheet within the annular seal, the male mold is moved into the second bubble to generally conform the second bubble to the male mold protrusion surface, vacuum is applied to the protrusion surface to totally conform the second bubble to the protrusion surface, and the members are brought together to selectively fuse the first plastic sheet to the second plastic sheet to form the twin sheet plastic article. This methodology allows the plastic sheets to be selectively and controllably stretched prior to the actual thermoforming against the respective mold surfaces so as to substantially avoid uncontrolled thinning of the sheets during the molding of the sheets against the mold surfaces.

According to a further feature of the invention, the step of moving the first bubble into general conformity with the cavity surface is accomplished by moving the male mold into the first bubble.

According to a further feature of the invention, the auxiliary device comprises a pre-draw box having an open box configuration including an upper peripheral edge surface and a cavity defined within the edge surface, and the pre-draw box is moved upwardly to move the peripheral edge surface into sealing engagement with the undersurface of the second plastic sheet. This arrangement provides a ready and convenient means of forming the bubble in the second plastic sheet to preclude thinning of the second plastic sheet during the subsequent thermoforming operation.

In the disclosed embodiment of the invention methodology, the female mold is positioned beneath the male mold; the female mold is moved upwardly into sealing engagement with the underside of the first plastic sheet to form the annular seal with the first plastic sheet; the male mold is lowered into the bubble in the first plastic sheet to move the bubble into general conformity with the cavity surface, whereafter the male mold is raised; the pre-draw box is moved upwardly into sealing engagement with the underside of the second plastic sheet to form the annular seal with the second plastic sheet; and the male mold is moved downwardly into the bubble in the second plastic sheet to generally conform the bubble to the protrusion surface. This specific relative orientation and movement of the male mold, female mold, and pre-draw box provides a ready and convenient methodology for forming the twin sheet plastic article.

BRIEF DESCRIPTION OF THE DRAWING

FIG. 1 is a perspective view of a deep draw twin plastic article formed in accordance with the invention methodology; and FIGS. 2–10 illustrate successive steps in the invention method to form a deep draw twin sheet plastic article.

DETAILED DESCRIPTION OF THE PREFERRED EMBODIMENT

Figure 5:
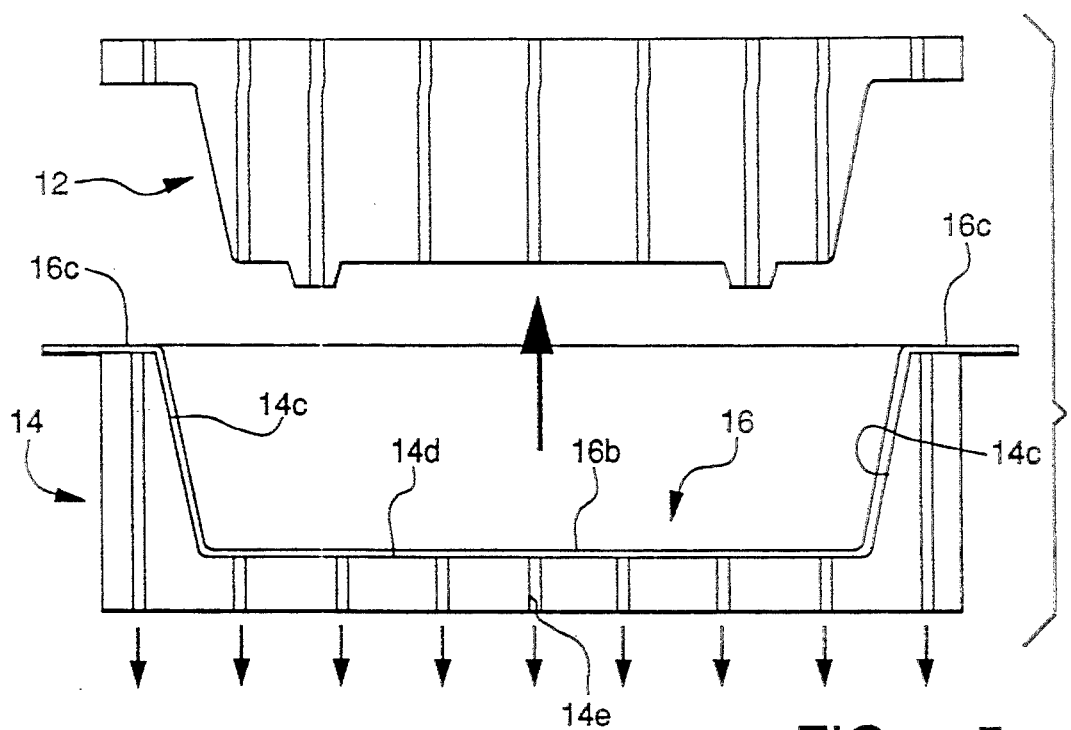

The invention method is utilized to produce a deep draw plastic twin sheet article 10. Article 10 may comprise, for example, a bin or container and includes side walls 10a, a rim 10b, and a bottom 10c. It will be understood that container or bin 10 may be used alone or may be used in combination with a similar bin or container which is inverted with respect to the container 10 to form a closed container.

Whereas various plastic materials may be used for the sheets to form the twin sheet article, it has been found that high density polyethylene (having, for example, a density of approximately 0.950 grams per cubic centimeter) provides a preferred material since, in a heated state, it readily and totally fuses with itself and since it takes on heat slowly and releases heat slowly so as to be compatible with the relatively long cycle times required for forming plastic articles utilizing the twin sheet methodology.

The thicknesses of the sheets may also vary depending upon the application, but a starting gage of 0.150 has been found satisfactory for most applications. Also, although not shown, it will be understood that the invention method, in accordance with known twin sheet methodology, is carried out utilizing multi-station rotary equipment which includes sheet heating oven stations and at least one forming station and wherein individual sheets of heated plastic are sequentially fed to the forming station for thermoforming with respect to the upper or lower molds with the sheets held and transported between the stations by rectangular clamp frames engaging the periphery of the sheets. An upper male mold or platen 12 and a lower female mold or platen 14 are positioned at the forming station and are movable upwardly and downwardly in known manner by means not shown to accomplish the various forming operations.

Male mold 12 is shown somewhat schematical and includes a rim portion 12a; a downwardly extending protrusion portion 12b including an annular side wall surface 12c and a bottom wall surface 12d; and a plurality of spaced vertical passages 12e coacting with vacuum equipment (not shown) to create a vacuum condition along the molding surfaces 12a and 12d. Although molds 12 and 14 are seen two dimensionally in FIGS. 2–12, it will be understood that each mold has a rectangular size and shape in plan view generally corresponding to the rectangular size and shape of the completed article as seen in FIG. 1.

Lower female mold or platen 14 is shown somewhat schematically and includes an annular upper edge surface 14a, a cavity 14b defined within annular edge surface 14a and including an annular side wall surface 14c and a bottom wall surface 14d, and a plurality of spaced vertical passages 14e opening at their upper ends in mold surfaces 14a and 14d and communicating at their lower ends with suitable vacuum and/or pressurized air equipment (not shown).

The manner in which the invention methodology is utilized to produce the twin sheet article of FIG. 1 is shown sequentially in FIGS. 2–10.

In FIG. 2 a first or lower plastic sheet 16 is seen positioned between the upper male mold 12 and the lower male mold 14 by a clamp frame 18. It will be understood that the sheet has previously been heated in an oven station of the rotary equipment and moved by the clamp frame to the position shown in FIG. 2. It will further be understood that the sheet 16 is rectangular and is oversized in all directions with respect to rectangular molds 12 and 14 and that frame 18 is rectangular and clampingly grips the sheet along all four sides of the sheet.

As previously indicated, molds 12 and 14 are moveable upwardly and downwardly by means not shown during the various steps in forming the twin sheet plastic article. After the heated lower sheet 16 has been positioned by the frame 18 between the spaced upper and lower molds as seen in FIG. 2, the lower female mold is raised as seen in FIG. 3 to bring the annular upper edge 14a of the female mold into sealing engagement with the lower face 16a of the sheet 16 to form an annular seal with the plastic sheet 16 whereafter, as further seen in FIG. 3, pressurized air is introduced through passages 14e into the cavity 14b where it acts upwardly on the underface 16a of the sheet and bulges the sheet upwardly within the annular seal to form an upwardly extending plastic bubble 16b as seen in dash lines in FIG. 3.

As the bubble is formed the plastic sheet material constituting the bubble is of necessity thinned to accommodate the larger surface area of the bubble 16b as compared to the previous flat surface of the sheet with the thinning occurring substantially uniformly throughout the extent of the bubble. Following the formation of the bubble 16b, upper male mold 12 is lowered, as seen in FIG. 4, as the pressurized air beneath the bubble within cavity 12b is released, whereby to bring the male mold protrusion surface 12d into engagement with the bubble 16b and move the bubble downwardly into female male cavity 14b to move the bubble 16b into general conformity with the mold cavity surfaces 14c and 14d whereafter, as seen in FIG. 5, the male mold is raised and vacuum is applied to the cavity surfaces 14d and 14a via the passages 14e to suck the bubble 16b downwardly into total conformance with the cavity surfaces 14c and 14d.

Clamp 18 is now released from the sheet 16, female mold 14, carrying lower sheet 16 conformed to the molding surface thereof, is lowered as seen in FIG. 6, a pre-draw box 20 is moved laterally into a location between the male mold 12 and the lowered female mold 14, and a second or upper sheet 22 is moved by a clamp frame 18 into a location between male mold 12 and pre-draw box 20. Lower or second sheet 22 is preferably introduced into the mold assembly along the same sheet line on which the first of upper sheets 16 was introduced.

Pre-draw box 20 has a generally rectangular configuration and includes an annular upper edge 20a and an annular side wall 20b coacting with a bottom wall 20c to define a box cavity 20d. Cavity 20d is larger in cross-sectional configuration than male mold protrusion 12c and female mold cavity 14b. For example, if protrusion 12c and cavity 14b have a general overall cross-sectional dimension of 40 inches×40 inches, cavity 20c may have a general overall cross-sectional configuration of 48 inches×48 inches.

Following the positioning of the pre-draw box 20 and the second or upper sheet 22 within the mold assembly, and as seen in FIG. 7, pre-draw box 20 is moved upwardly to bring pre-draw box annular upper edge 20a into sealing engagement with the lower face 22a of the sheet 16 to form an annular seal with the sheet, whereafter a vacuum condition is created within box cavity 20d utilizing vacuum equipment associated with passages 20e in the bottom wall 20d of the box. The vacuum condition within cavity 20d has the effect of drawing the sheet 22 downwardly to form a downwardly extending bubble 22b positioned within the cavity 20d. As the bubble 22b is formed, the plastic sheet material constituting the bubble is of necessity thinned to accommodate the larger surface area of the bubble as compared to the previous flat surface of the sheet with the thinning occurring substantially uniformly throughout the extent of the bubble.

Figure 8:
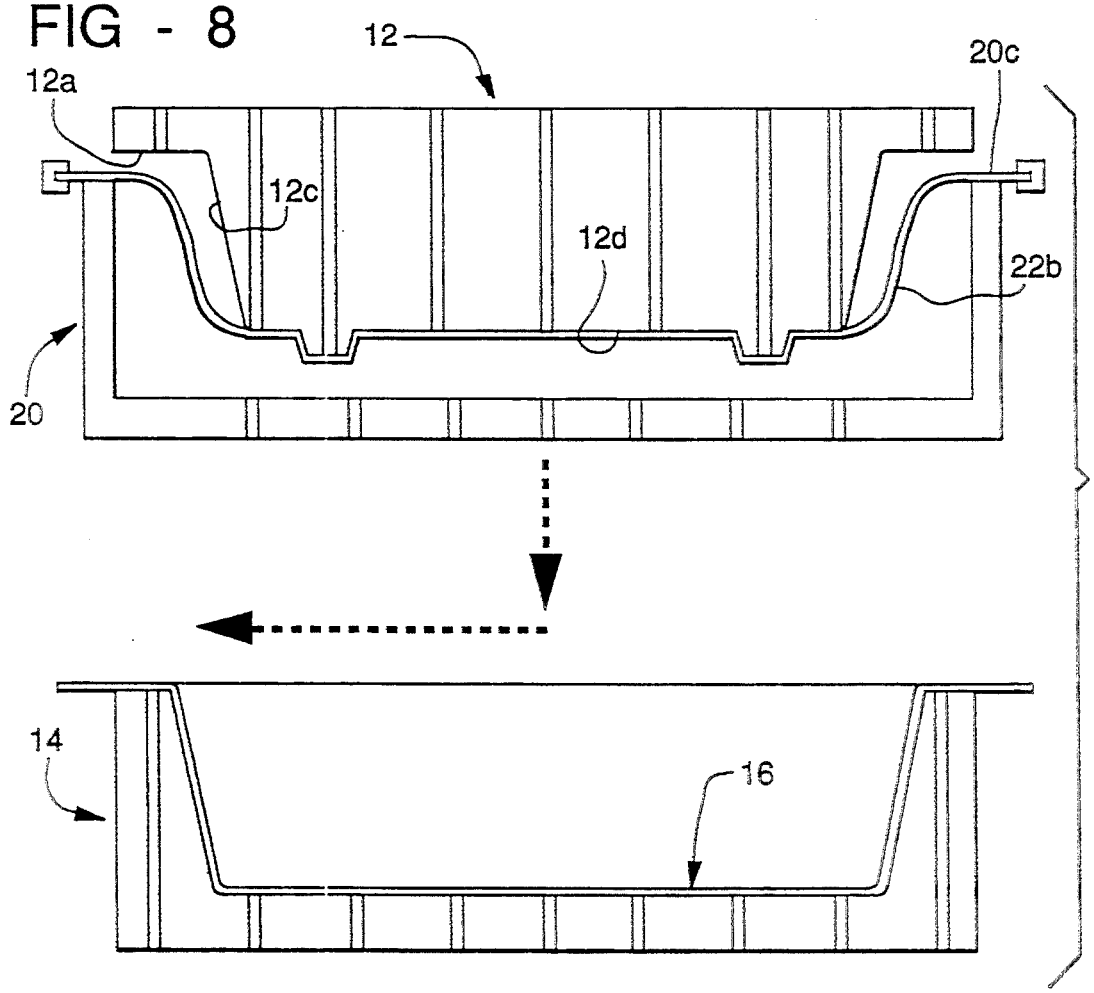
Figure 9:
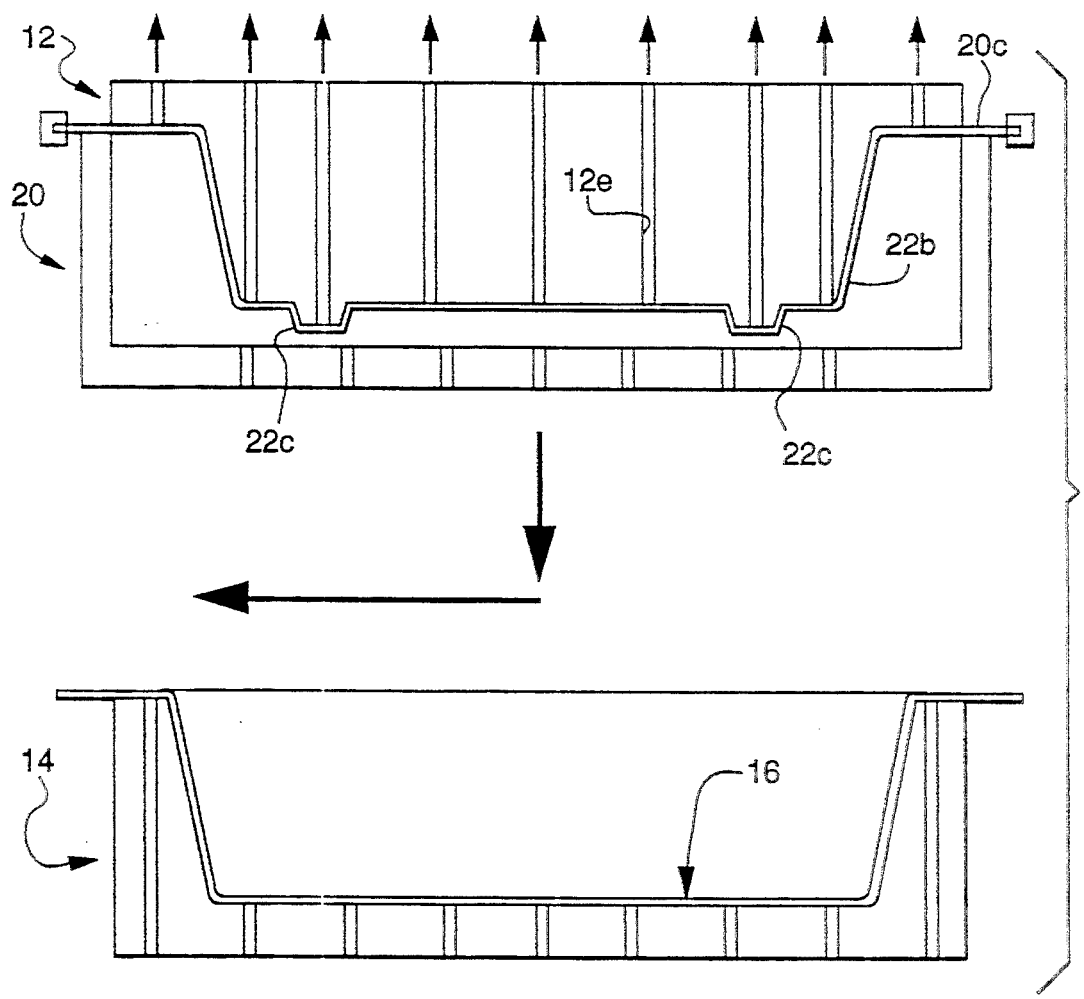

Following the formation of the bubble 22b, and as seen in FIG. 8, the male mold 12 is lowered into the bubble 22b to move the bubble into general conformity with the molding surfaces 12a, 12c, and 12d of the male mold whereafter, as seen in FIG. 9, the vacuum condition in box cavity 20d is released and vacuum is applied to molding surfaces 12a and 12d utilizing vacuum equipment in association with passages 12e to totally conform the bubble 20b to the male mold surfaces 12a, 12c, and 12d. Male mold 12 preferably includes a plurality of ridges or runners 12f on the lower molding surface 12d so that, as the bubble 22b is drawn upwardly into total conformity to the male mold molding surface, spaced ridges or runners 22c are formed along the lower face of the upper sheet 22.

Figure 10:
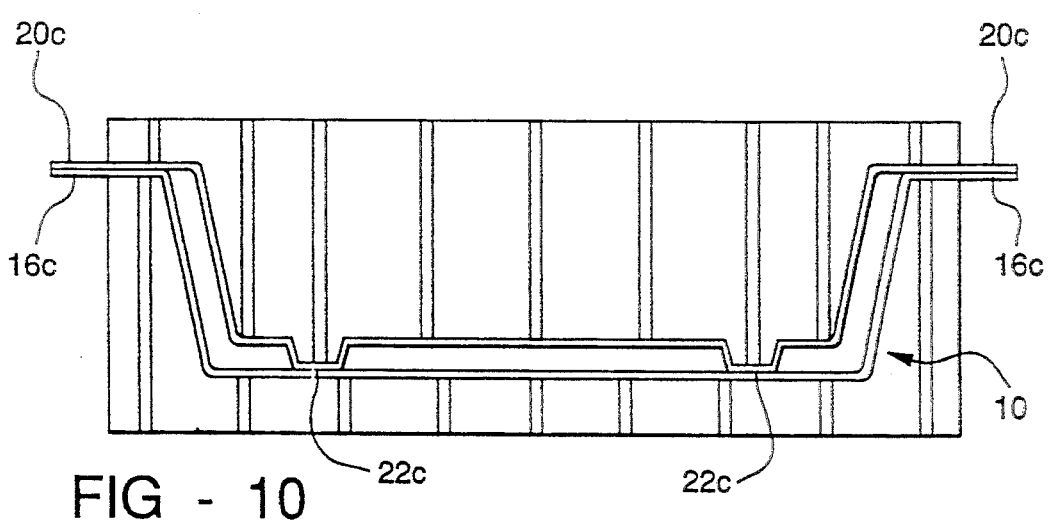

Pre-draw box 20 is now lowered and then withdrawn laterally from the mold assembly, clamp 18 is released from sheet 20, and molds 12 and 14 are moved together as seen in FIG. 10 to form the twin sheet plastic container 10 with the ridges 22c serving to space the upper sheet 16 from the lower sheet 22 in the final article configuration so that spaced sheets act in the manner of a beam in the final article configuration to provide structural rigidity in accordance with known twin sheet technology. The sheets may also be selectively fused together at further points along their confronting interfaces and are preferably fused together at their peripheral rim portions 16c and 20c to form the rim portion 10b of the twin sheet plastic container 10. Following the formation of the article as seen in FIG. 10, the molds are separated, the container 10 is removed, and the fused together peripheral edges 16c, 20c are trimmed to form the final container configuration.

The invention methodology will be seen to have many important advantages. Specifically, by carefully stretching the plastic in the form of a bubble prior to actually thermoforming the upper and lower sheets to the mold surfaces of the upper and lower molds respectively, the thinning of the plastic material in the portion of the sheet to be ultimately molded to the molding surfaces is carefully controlled to provide a substantially uniform stretching of the sheet, and thereby a substantially uniform thinning of the sheet, over substantially the entire area of the bubble portion. As a result, the thicknesses of tile sheets in the areas of the thermoformed portion is substantially constant and there are consequently no excessively thinned or weakened areas in the resulting twin sheet article.

Whereas a preferred embodiment of the invention has been illustrated and described in detail, it will apparent that various changes may be made in the disclosed embodiments without departing from the scope or spirit of the invention. For example, although the invention methodology has been illustrated and described as including the formation of an upwardly extending bubble 16b in the first or lower sheet 16 (utilizing the female mold 14) and the formation of a downwardly extending bubble 22b in the second or upper sheet 22 (utilizing the pre-draw box 20), it will be apparent that the bubble in the first or lower sheet 16 may be formed as a downwardly extending bubble 22c utilizing a vacuum condition created in the cavity 14b of the female mold and/or the bubble in the second or upper sheet 22 may be formed as an upwardly extending bubble 22c utilizing pressurized air introduced into the cavity 20d of the pre-draw box through passages 20e. As a further example, although the invention methodology has been illustrated and described as utilizing the male mold to move the bubble in the first sheet downwardly into the female mold cavity, the invention may also be carried out utilizing a separate plug assist device to move the bubble in the first sheet downwardly into the female mold cavity.

I claim:

1. A method of forming a twin sheet plastic article comprising the steps of:
   providing a male mold having a protrusion;
   providing a female mold having a cavity generally complementary to the male mold protrusion;
   positioning the male and female molds in spaced relation;
   heating a first plastic sheet to a heated, flowable state;
   positioning the first plastic sheet between the molds;
   moving the female mold into sealing engagement with a surface of the first plastic sheet to form an annular seal with the first plastic sheet;
   forming a first bubble in the first plastic sheet within the annular seal;
   moving the male mold into engagement with the first bubble to move the first bubble into general conformity with the cavity surface;
   applying vacuum to the cavity surface to conform the first bubble totally to the cavity surface;
   heating a second plastic sheet to a heated, flowable state;
   positioning the second plastic sheet between the molds;
   positioning a pre-draw box between the second plastic sheet and the female mold;
   moving the pre-draw box into sealing engagement with a surface of the second plastic sheet to form an annular seal with the second plastic sheet;
   forming a second bubble in the second plastic sheet within the annular seal;
   moving the male mold into the second bubble to generally conform the second bubble to the protrusion surface;
   applying vacuum to the protrusion surface to conform the second bubble totally to the protrusion surface;
   removing the pre-draw box; and
   with the first and second sheets still in a heated, flowable state, bringing the molds together to selectively fuse the first plastic sheet to the second plastic sheet to form the twin sheet plastic article.

2. A method according to claim 1 wherein:
   the first bubble is formed by supplying pressurized fluid to the female mold cavity to push the sheet upwardly above the female mold cavity.

3. A method according to claim 1 wherein:
   the first bubble is formed by creating a vacuum in the cavity of the female mold to suck the sheet downwardly within the female mold cavity.

4. A method according to claim 1 wherein:
   the pre-draw box has an open box configuration including an upper peripheral edge surface and a cavity defined within the edge surface; and
   the pre-draw box is moved upwardly to move the peripheral edge surface into sealing engagement with the undersurface of the second plastic sheet.

5. A method according to claim 4 wherein:
   the second bubble is formed by supplying pressurized fluid to the pre-draw box cavity to push the sheet upwardly above the pre-draw box cavity.

6. A method of utilizing a male mold having a protrusion surface and a female mold having a cavity surface generally complementary to the protrusion surface to thermoform first and second plastic sheets and thereafter fuse the sheets together to form a twin sheet plastic article, characterized in that:
   the first and second plastic sheets are heated to a heated, flowable state, the female mold is moved into sealing engagement with a surface of the first plastic sheet to form an annular seal, a first bubble is formed in the first plastic sheet within the annular seal, the male mold is moved into engagement with the first bubble to move the first bubble into general conformity with the cavity surface, vacuum is applied to the cavity surface to totally conform the first bubble to the cavity surface, an auxiliary mold device is moved against a surface of the second plastic sheet to form an annular seal, a second bubble is formed in the second plastic sheet within the annular seal, the male mold is moved into the second bubble to generally conform the second bubble to the protrusion surface, vacuum is applied to the protrusion surface to totally conform the second bubble to the protrusion surface, and, with the sheets still in a heated, flowable state, the molds are brought together to selectively fuse the first plastic sheet to the second plastic sheet to form the twin sheet plastic article.

7. A method according to claim 6 wherein:
the first bubble is formed by supplying pressurized fluid to the female mold cavity to push the sheet upwardly above the female mold cavity.

8. A method according to claim 6 wherein:
the first bubble is formed by creating a vacuum in the female mold cavity to suck the sheet downwardly within the female mold cavity.

9. A method according to claim 6 wherein:
the auxiliary mold device comprises a pre-draw box having an open box configuration including an upper peripheral edge surface and a cavity defined within the edge surface; and
the pre-draw box is moved upwardly to move the peripheral edge surface into sealing engagement with the underside of the second plastic sheet.

10. A method according to claim 9 wherein:
the second bubble is formed by supplying pressurized fluid to the pre-draw box cavity to push the sheet upwardly above the pre-draw box cavity.

11. A method of forming a twin sheet plastic article comprising the steps of:
providing a male mold having a protrusion;
providing a female mold having a cavity generally complementary to the male mold protrusion;
positioning the male and female molds in spaced relation;
positioning a first plastic sheet between the molds;
moving the female mold into sealing engagement with a surface of the first plastic sheet to form an annular seal with the first plastic sheet;
forming a first bubble in the first plastic sheet within the annular seal;
moving the first bubble into general conformity with the cavity surface;
applying vacuum to the cavity surface to conform the first bubble totally to the cavity surface;
positioning a second plastic sheet between the molds;
positioning a pre-draw box, having an open box configuration, including an upper peripheral edge surface and a cavity defined within the edge surface, between the second plastic sheet and the female mold;
moving the pre-draw box upwardly to move the peripheral edge surface into sealing engagement with the undersurface of the second plastic sheet to form an annular seal with the second plastic sheet;
forming a second bubble in the second plastic sheet within the annular seal by creating a vacuum in the pre-draw box cavity to suck the sheet downwardly within the pre-draw box cavity;
moving the male mold into the second bubble to generally conform the second bubble to the protrusion surface;
applying vacuum to the protrusion surface to conform the second bubble totally to the protrusion surface;
removing the pre-draw box; and
bringing the molds together to selectively fuse the first plastic sheet to the second plastic sheet to form the twin sheet plastic article.

12. A method of forming a twin sheet plastic article comprising the steps of:
providing a male mold having a protrusion;
providing a female mold having a cavity generally complementary to the male mold protrusion;
positioning the male and female molds in spaced relation with the female mold beneath the male mold;
positioning a first plastic sheet between the molds;
moving the female mold upwardly into sealing engagement with the undersurface of the first plastic sheet to form an annular seal with the first plastic sheet;
forming a first bubble in the first plastic sheet within the annular seal;
moving the male mold downwardly into the first bubble to move the first bubble into general conformity with the cavity surface and thereafter raising the male mold;
applying vacuum to the cavity surface to conform the first bubble totally to the cavity surface;
positioning a second plastic sheet between the molds;
positioning a pre-draw box between the second plastic sheet and the female mold;
moving the pre-draw box upwardly into sealing engagement with the undersurface of the second plastic sheet to form an annular seal with the second plastic sheet;
forming a second bubble in the second plastic sheet within the annular seal;
moving the male mold downwardly into the second bubble to generally conform the second bubble to the protrusion surface;
applying vacuum to the protrusion surface to conform the second bubble totally to the protrusion surface;
removing the pre-draw box; and
bringing the molds together to selectively fuse the first plastic sheet to the second plastic sheet to form the twin sheet plastic article.

13. A method of utilizing a male mold having a protrusion surface and a female mold having a cavity surface generally complementary to the protrusion surface to thermoform first and second plastic sheets and thereafter fuse the sheets together to form a twin sheet plastic article, characterized in that:
the female mold is moved into sealing engagement with a surface of the first plastic sheet to form an annular seal, a first bubble is formed in the first plastic sheet within the annular seal, the male mold is moved into the first bubble to move the first bubble into general conformity with the cavity surface, vacuum is applied to the cavity surface to totally conform the first bubble to the cavity surface, a predraw box, having an open box configuration including an upper peripheral edge surface and a cavity defined within the edge surface, is moved upwardly to move the peripheral edge surface into sealing engagement with the underside of the second plastic sheet to form a annular seal, a second bubble is formed in the second plastic sheet within the annular seal by creating a vacuum in the pre-draw box cavity to suck the sheet downwardly within the pre-draw box cavity, the male mold is moved into the second bubble to generally conform the second bubble to the protrusion surface, vacuum is applied to the protrusion surface to totally conform the second bubble to the protrusion surface, and the molds are brought together to selectively fuse the first plastic sheet to the second plastic sheet to form the twin sheet plastic article.

14. A method of utilizing a male mold having a protrusion surface and a female mold having a cavity surface generally complementary to the protrusion surface to thermoform first and second plastic sheets and thereafter fuse the sheets together to form a twin sheet plastic article, characterized in that:

the female mold is positioned beneath the male mold and is moved upwardly into sealing engagement with the underside of the first plastic sheet to form an annular seal, a first bubble is formed in the first plastic sheet within the annular seal, the male mold is lowered into the first bubble to move the first bubble into general conformity with the cavity surface, vacuum is applied to the cavity surface to totally conform the first bubble to the cavity surface, a predraw box, having an open box configuration including an upper peripheral surface and a cavity defined within the edge surface, is moved upwardly to move the upper peripheral edge surface into sealing engagement with the underside of the second plastic sheet to form an annular seal, a second bubble is formed in the second plastic sheet within the annular seal, the male mold is moved downwardly into the second bubble to generally conform the second bubble to the protrusion surface, vacuum is applied to the protrusion surface to totally conform the second bubble to the protrusion surface, and the molds are brought together to selectively fuse the first plastic sheet to the second plastic sheet to form the twin sheet plastic article.

* * * * *